(12) United States Patent
Soldani (10) Patent No.: US 10,049,111 B2
(45) Date of Patent: Aug. 14, 2018

(54) MAINTENANCE ASSISTANCE FOR AN AIRCRAFT BY AUGMENTED REALITY

(71) Applicant: Airbus Operations (SAS), Toulouse (FR)

(72) Inventor: Siegfried Soldani, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 218 days.

(21) Appl. No.: 14/805,115

(22) Filed: Jul. 21, 2015

(65) Prior Publication Data

US 2016/0019212 A1 Jan. 21, 2016

(30) Foreign Application Priority Data

Jul. 21, 2014 (FR) ...................................... 14 57015

(51) Int. Cl.
*G06G 5/00* (2006.01)
*G06K 9/00* (2006.01)
(Continued)

(52) U.S. Cl.
CPC .......... *G06F 17/30047* (2013.01); *B64F 5/40* (2017.01); *B64F 5/60* (2017.01); *G06F 3/011* (2013.01); *G06F 3/147* (2013.01); *G06K 9/22* (2013.01); *G06K 9/3241* (2013.01); *G06Q 10/20* (2013.01); *G06T 1/0007* (2013.01); *G06T 15/005* (2013.01); *G06T 19/006* (2013.01); *G09G 5/00* (2013.01); *G06T 2200/04* (2013.01); *G06T 2200/28* (2013.01); *G06T 2207/10004* (2013.01); *G06T 2210/61* (2013.01); *G06T 2215/16* (2013.01); *G06T 2219/004* (2013.01); *G09G 2354/00* (2013.01); *G09G 2370/022* (2013.01); *G09G 2380/12* (2013.01)

(58) Field of Classification Search
CPC .................................................. G06F 17/30047
USPC .......................................................... 345/633
See application file for complete search history.

(56) References Cited

U.S. PATENT DOCUMENTS 9,019,128 B1 * 4/2015 Kim, II .................. G01C 23/00
340/945
9,446,856 B1 * 9/2016 Roling ................... B64D 47/00
(Continued)

OTHER PUBLICATIONS

French Search Report, dated Apr. 20, 2015.

*Primary Examiner* — Samantha (Yuehan) Wang
(74) *Attorney, Agent, or Firm* — Greer, Burns & Crain, Ltd.

(57) ABSTRACT

A method for supporting aircraft maintenance, performed in a system comprising a display selection device and a portable device with a camera and an augmented reality display. The method comprises the steps of acquiring images of an equipment of the aircraft with the camera, and sending them to the display selection device; identifying the equipment present in these images with the display selection device and determining the identifier thereof, referred to as the useful identifier; on the basis of the useful identifier, sending maintenance assistance data with the display selection device to the augmented reality display; in response, displaying, in augmented reality, images corresponding to the data with the augmented reality display device. The method also comprises steps for displaying guidance data guiding towards one equipment in particular. A device for implementing such a method is also disclosed.

14 Claims, 4 Drawing Sheets

(51) Int. Cl.

| | |
|---|---|
| *G06F 17/30* | (2006.01) |
| *G06T 19/00* | (2011.01) |
| *G09G 5/00* | (2006.01) |
| *G06T 1/00* | (2006.01) |
| *G06T 15/00* | (2011.01) |
| *G06K 9/32* | (2006.01) |
| *G06K 9/22* | (2006.01) |
| *G06F 3/01* | (2006.01) |
| *G06F 3/147* | (2006.01) |
| *G06Q 10/00* | (2012.01) |
| *B64F 5/60* | (2017.01) |
| *B64F 5/40* | (2017.01) |

(56) References Cited

U.S. PATENT DOCUMENTS

| | | | | |
|---|---|---|---|---|
| 2013/0253824 | A1* | 9/2013 | Yang | G01C 21/20 |
| | | | | 701/522 |
| 2014/0022281 | A1* | 1/2014 | Georgeson | G06F 3/1454 |
| | | | | 345/633 |
| 2015/0339453 | A1* | 11/2015 | Richards | G06T 11/00 |
| | | | | 345/633 |

* cited by examiner

MAINTENANCE ASSISTANCE FOR AN AIRCRAFT BY AUGMENTED REALITY

CROSS-REFERENCES TO RELATED APPLICATIONS

This application claims the benefit of the French patent application No. 1457015 filed on Jul. 21, 2014, the entire disclosures of which are incorporated herein by way of reference.

BACKGROUND OF THE INVENTION

The present invention relates to the field of aircraft maintenance assistance.

When an aircraft develops a fault, the airline maintenance center is informed of this and plans one or more maintenance operation(s) to be carried out on the aircraft. The airline maintenance center may also plan one or more preventive maintenance operation(s). Each maintenance operation comprises, for example, replacing, adjusting and/or repairing at least one aircraft equipment. Such an equipment is, for example, a landing gear brake, a landing gear wheel, a wheel control system, etc.

A technician is provided with a list of these maintenance operations so that he can carry them out. The aircraft downtime corresponds at least to the entire duration of the technician intervention.

The list of operations is accompanied with specific information relating to each operation, that accompanies the technician in his task. This specific information includes a list of elementary steps relating to each operation on the list. This then notably ensures that the elementary steps associated with a maintenance operation are performed in an order that allows the length of aircraft downtime to be optimized.

It is an objective of the present invention to propose an aircraft maintenance assistance method and device that allows this downtime to be reduced still further.

SUMMARY OF THE INVENTION

This objective is achieved with a method for supporting aircraft maintenance, performed in a system comprising:
  display selection means; and
  a portable device comprising a camera and augmented reality display means.

The method according to the invention comprises the following steps:
  the camera acquires images of an equipment of the aircraft, and sends these images to the display selection means;
  the display selection means identify the equipment present in the said images and determine an identifier of the identified equipment, referred to as the useful identifier;
  from this useful identifier the display selection means select maintenance assistance data relating to the identified equipment and send these data to the augmented reality display means;
  in response, the augmented reality display means display, in augmented reality, images corresponding to the maintenance assistance data.

Thus, the user equipped with the portable device according to the invention looks at a view of an equipment item, on which the images corresponding to the maintenance assistance data are overlaid.

The display performed by the augmented reality display means allows the user equipped with the portable device according to the invention quickly to identify an equipment on which he is to carry out at least one step of a maintenance operation. This then reduces the time spent searching for this equipment.

Furthermore, this display allows the user easily to visualize information relating to the performance of the maintenance operation. This then reduces the time taken to access such information.

Thus, the maintenance assistance method according to the invention makes it possible to reduce the downtime of an aircraft on which a maintenance operation is carried out.

The portable device supplies the data selection means with a position of the portable device.

The display selection means perform a comparison between the position of the portable device and a position of an equipment of interest, the equipment of interest corresponding to an identifier of interest from a list of identifiers of interest such that the display selection means send out maintenance assistance data only when the useful identifier corresponds to one of the identifiers of interest from the list.

The method according to the invention then comprises the following steps:
  the display selection means select guidance data guiding towards an equipment of interest and send these data to the augmented reality display means; and
  the augmented reality display means display, in augmented reality, images corresponding to these guidance data.

Thus it is possible to guide a user to a particular equipment where a maintenance operation is planned. This guidance is also performed in augmented reality, which avoids the user needing to find his position on a drawing.

Once the user has reached this equipment referred to as equipment of interest using the guidance data displayed in augmented reality, this equipment of interest will be identified on the images supplied by the camera and this will allow maintenance assistance data relating to this equipment of interest to be displayed, in augmented reality.

For preference, the display selection means perform the following steps:
  receiving a list of at least one identifier of interest, each identifier of interest corresponding to an equipment of interest;
  comparing the useful identifier and at least one identifier of interest from the list; and
  selecting the said maintenance assistance data and sending these data out only when the useful identifier corresponds to an identifier of interest from the list.

The display selection means advantageously perform the following steps:
  receiving a request relating to at least one maintenance operation to be carried out;
  extracting the list of at least one identifier of interest, using this request, an identifier of interest corresponding to an equipment of interest, and the equipment of interest forming an equipment associated with one from the at least one maintenance operations to be carried out.

For each identifier of interest from the list, and on the basis of the request relating to at least one maintenance operation to be carried out, the selection display means may extract a position of the corresponding equipment of interest.

For each identifier of interest from the list, and on the basis of the request relating to at least one maintenance operation to be carried out, the selection display means extract corresponding maintenance assistance data.

In order to provide its position, the portable device advantageously performs the following steps:

determining a rough position of the portable device, relative to a point of reference;

comparing this rough position with a model of the aircraft;

determining the position of the portable device, relative to the said aircraft.

In order to identify the equipment present in the said images, the display selection means may select a list of equipment situated in proximity to the portable device, on the basis of the position of the portable device and of the positions of the aircraft equipment.

The method according to the invention advantageously comprises the following steps:

the display selection means select and send out to the augmented reality display means, alert data relating to the proximity of an equipment of interest when the position of the portable device corresponds to the position of an equipment of interest; and the augmented reality display means display, in augmented reality, images corresponding to these alert data.

The method according to the invention may comprise a step whereby the request relating to at least one maintenance operation to be carried out is formulated by a human operator and using a man-machine interface.

The method according to the invention may comprise a step whereby the request relating to at least one maintenance operation to be carried out is sent out by a maintenance center.

The invention also relates to a system for supporting aircraft maintenance, comprising:

display selection means; and a portable device comprising a camera and augmented reality display means.

According to the invention, the system has the following features:

the camera is connected to the display selection means and set out to capture images and to send these images to the display selection means;

the display selection means are connected to the camera and to the augmented reality display means, and are set out to identify an aircraft equipment present in the said images, determine an identifier of the identified equipment, referred to as the useful identifier, select maintenance assistance data relating to the equipment identified using the useful identifier, and send these data to the augmented reality display means; and the augmented reality display means are set up to receive these maintenance assistance data and, in response, display in augmented reality images corresponding to these maintenance assistance data.

Furthermore, the said system has the following features:

the portable device comprises a geolocation module connected to the display selection means to supply them with a position of the portable device;

the display selection means comprise a comparator for comparing the position of the portable device and the position of an equipment of interest, the equipment of interest corresponding to an identifier of interest from a list of identifiers of interest such that the display selection means send out the maintenance assistance data only when the useful identifier corresponds to one of the identifiers of interest from the list; and the display selection means are set up to select guidance data guiding towards an equipment of interest and send these data out to the augmented reality display means; and the augmented reality display means are set up to receive these guidance data and, in response, display in augmented reality images corresponding to these guidance data.

For preference, the display selection means comprise:

the shape recognition means set up to identify the aircraft equipment from the images captured by the camera, and supplying as output the useful identifier; and a display selection module receiving the useful identifier as input and, in response, providing the augmented reality display means with the maintenance assistance data relating to the equipment identified.

BRIEF DESCRIPTION OF THE DRAWINGS

The present invention will be better understood from reading the description of some exemplary embodiments given purely by way of non-limiting indication and with reference to the attached drawings in which.

DETAILED DESCRIPTION OF THE PREFERRED EMBODIMENTS

Figure 1:
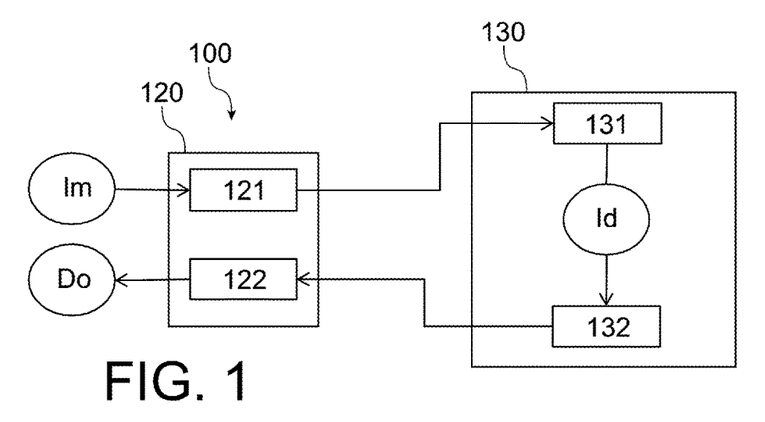
FIG. 1 schematically depicts a first embodiment of a maintenance assistance system according to the invention.

For the sake of clarity, FIG. 1 illustrates only some of the elements of the invention, particularly the elements relating to the display of maintenance assistance data. The display of guidance data is introduced only into the subsequent figures, particularly FIGS. 4A, 4B, 5 and 7. However, although not described specifically in the description relating to certain figures, the display of guidance data as a function of a current position of the portable device is found in each one of the embodiments of the method and device according to the invention.

FIG. 1 schematically illustrates a first embodiment of an aircraft maintenance assistance system 100 according to the invention.

The system 100 according to the invention comprises a portable device 120 and display selection means 130.

The portable device 120 and the display selection means 130 are in communication with one another, for example via a wireless communication.

The portable device 120 comprises a camera 121 and augmented reality display means 122.

The augmented reality display means 122 denote any device such that an observer observes a view of his surroundings, over which graphical data relating to this environment are overlaid. These graphical data may comprise a text, symbols, or any other visual, and may simply be dubbed "images". This may be a transparent overlay.

In particular, the augmented reality display means 122 may denote:

a device comprising a projector that projects these graphical data directly onto the environment surrounding it;

a device comprising a micro screen and means (for example augmented reality glasses) for projecting toward the eye of a user so that the user equipped with this device and observing an environment sees both this environment and an image from the micro screen; or a device comprising display means displaying an image of the surrounding environment over which the said graphical data are overlaid (a computer provided with a screen and with a camera, for example a laptop computer, a tablet, a smartphone, etc.).

The user here denotes a human operator, particularly a technician.

The device 120 is said to be portable because it is of small size, for example representing less than 0.05 m3, and low weight, for example less than 5 kg. It can be held in the hand or carried by the user about his person, for example in the form of goggles.

The display selection means 130 denote calculation means notably comprising a processor, for example a microprocessor.

The system 100 according to the invention may be formed for example by:

a device of the computer type, notably a laptop computer, a tablet, a smartphone, comprising a miniature camera, display means (augmented reality display means 122) and a processor (display selection means 130);

a device of the computer type, notably a laptop computer, a tablet, a smartphone, comprising a miniature camera, a projector (augmented reality display means 122) and a processor (display selection means 130); or augmented reality goggles or helmet (augmented reality display means 122) equipped with a camera and connected by a wired connection or a wireless connection to a processor (display selection means 130).

The camera 121 is set up to capture at least one image Im of an external environment notably situated inside an aircraft (not depicted). In particular, the camera 121 is set up to capture images of an equipment of the aircraft.

The display selection means 130 may also be portable. They may be formed as one with the portable device, or remote and communicate with the portable device, in particular by wireless communication.

The display selection means 130 as depicted in FIG. 1 comprise shaped recognition means 131 and a display selection module 132.

The camera 121 is in communication with the display selection means 130 to transmit to them the said captured images. Within the display selection means, these images are processed, more particularly by shape recognition means 131.

The display selection means 130 are set up to identify, in at least one image captured by the camera 121, an equipment of the aircraft and determine an identifier of this equipment.

In this example depicted in FIG. 1, it is in particular the shape recognition means 131 which are set up to make such an identification. For that, the shape recognition means 131 comprise a database, grouping notably geometric data relating to a plurality of equipment that may be present in the aircraft. Within the database, each equipment is associated with an identifier. The shape recognition means therefore receive as input at least one image captured by the camera 121, and supply as output an identifier Id of an equipment present in the image, referred to as useful identifier. This identification is carried out in real time.

On the basis of the identifier Id, the display selection means 130 select maintenance assistance data relating to the equipment identified.

In particular, the identifier Id is transmitted to a display selection module 132 which, in response, supplies the said maintenance assistance data. The display selection module 132 comprises for example a database in which each equipment identifier is associated with maintenance assistance data relating to this equipment.

The maintenance assistance data relating to an equipment advantageously comprise details about the equipment itself, notably its identification (for example its FIN (Functional Item Number)). They may also comprise other data such as:

instructions for adjusting or handling the equipment;

a list of elementary steps to be performed when a maintenance operation is to be carried out on this equipment, for example elementary steps to be performed when this equipment is to be replaced, moved, tested for correct function, etc.;

explanatory three-dimensional animations, a view of other equipment situated behind it, so as to prevent a user from having to remove an equipment such as a panel in order to locate other equipment that are not directly visible, etc.

The display selection means 130 are in communication with the augmented reality display means 122 in order to transmit these maintenance assistance data thereto. In particular, the display selection module 132 is in communication with the augmented reality display means 122 in order to transmit these maintenance assistance data thereto. On the basis of these maintenance assistance data, the augmented reality display means 122 display, in augmented reality, images Do corresponding to these maintenance assistance data.

In particular, the augmented reality display means display the images corresponding to these maintenance assistance data in such a way that a user sees a view of the identified equipment, over which the said images are overlaid. The augmented reality display may take different forms, as specified hereinabove:

the said images may be projected directly onto the equipment itself, using a projector;

the said images may be displayed on a micro screen of augmented reality goggles, and projected into the field of view of the user so that this user sees the equipment with the said images displayed transparently on the view of the equipment;

the said images may be incorporated into an image of the equipment that is displayed by a screen such as a screen of a tablet.

The images corresponding to the maintenance assistance data may include text, a three-dimensional animation, a diagram, etc.

The augmented reality display preferably comprises performing tracking of the identified equipment. Thus, an image corresponding to the maintenance assistance data remains overlaid on a view of the identified equipment, whatever the movements of the camera.

The system 100, notably the portable device 120, may comprise a man-machine interface (not depicted). A user can thus formulate and send, to the display selection module 132, a request relating to the display of one of a number of images corresponding to maintenance assistance data. For example, the user may formulate a request requesting the display of information to assist him in replacing the equipment or in repairing such or such a part of the equipment, etc.

The maintenance assistance data displayed may relate to a maintenance operation to be carried out, or relate to all the maintenance operations that can be carried out on the equipment.

Figure 2A:
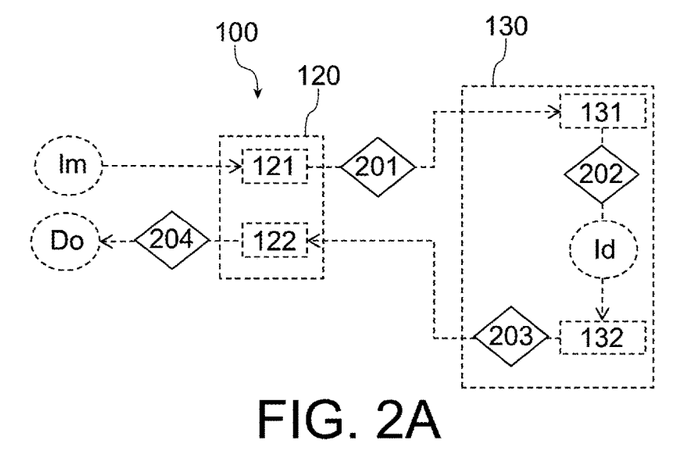
FIGS. 2A and 2B schematically illustrate a first embodiment of a maintenance assistance method according to the invention.
Figure 2B:
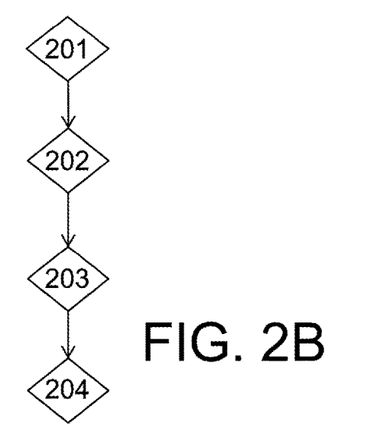

FIGS. 2A and 2B schematically illustrate the first embodiment of a method performed in particular in the system 100 depicted in FIG. 1.

FIG. 2B illustrates the method of the invention in the form of a flow diagram. FIG. 2A links each step of the flow diagram with the elements of the system 100. FIG. 2A corresponds to FIG. 1 (in dotted lines) to which the elements of the flow diagram depicted in FIG. 2B have been added.

The method according to the invention comprises the following steps:

the camera 121 records the image Im of an aircraft equipment and sends this image to the display selection means 130 (step 201);

the display selection means 130 identify the equipment present in the image Im and determine the identifier Id of this equipment, referred to as useful identifier (step 202);

on the basis of the identifier Id, the display selection means 130 select the maintenance assistance data relating to the equipment identified and send these data to the augmented reality display means 122 (step 203); and the augmented reality display means 122 receive these data and, in response, display, in augmented reality, the images corresponding to these maintenance assistance data.

Figure 3A:
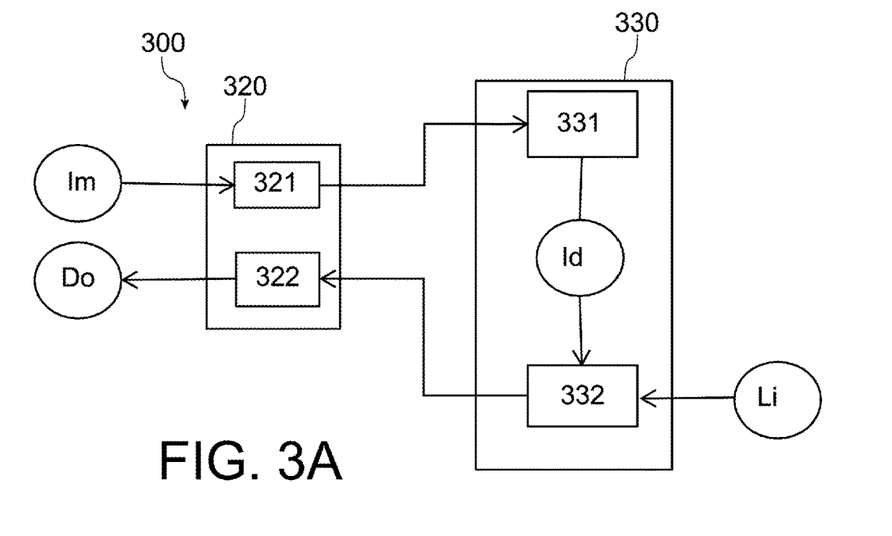
FIGS. 3A and 3B schematically illustrate a second embodiment of a system and a method according to the invention.
Figure 3B:
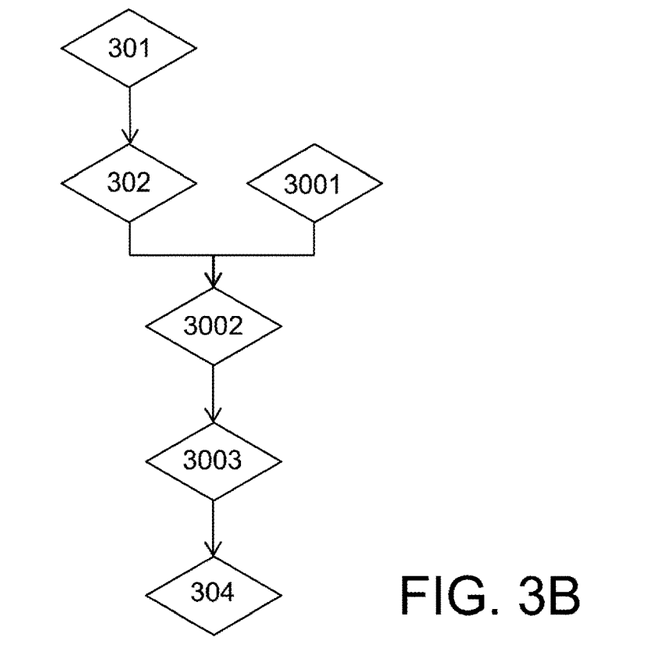

A second embodiment of a system and of a method according to the invention will now be described with reference to FIGS. 3A and 3B respectively.

The system 300 will be described only in terms of how it differs from the system 100 illustrated in FIG. 1. The same is true of the method. The numerical references of FIG. 3A correspond to the numerical references of FIG. 1, the numeral for the hundreds being replaced by a 3. The numerical references 301, 302, 304 of FIG. 3B correspond to the numerical references 101, 102, 104 of FIG. 2B.

In the system 300 according to the invention, the display selection means 330 are set up to receive a list Li of at least one identifier of interest, each identifier of interest being associated with an equipment of interest (step 3001). The display selection means 330 comprise a memory, to store the list Li, and means of communication with an external device supplying the list Li. The external device may consist of a man-machine interface from which a user formulates the list Li, or a maintenance center that has previously established the list on the basis, for example, of fault messages transmitted by the aircraft.

The equipment of interest from the list correspond to a list of equipment that need to be checked, adjusted, replaced or repaired.

This list is received in particular by the display selection module 332. The display selection module 332 is set up to compare the useful identifier Id and at least one identifier of interest from the list Li (step 3002). For preference, the display selection module 332 is set up to compare the useful identifier Id with each of the identifiers of interest. As an alternative, the display selection module may receive data allowing it to preselect a sub-list of identifiers of interest that may correspond to the useful identifier, for example on the basis of geolocation data.

The display selection module 332 selects maintenance assistance data and supplies these data only when the useful identifier is identical to one of the identifiers of interest from the list (step 3003).

Thus, this second embodiment of the invention allows maintenance assistance data to be displayed only for a reduced number of equipment corresponding to only those equipment that are to be adjusted, inspected, repaired or replaced. This then limits the quantity of information displayed. The effectiveness of the support supplied for aircraft maintenance is thus improved.

A third embodiment of a system and of a method according to the invention will now be described with reference to FIGS. 4A and 4B respectively.

The system 400 will be described only in terms of how it differs from the system 100 illustrated in FIG. 1. The numerical references of FIG. 4A correspond to the numerical references of FIG. 1, the numeral for the hundreds being replaced by a 4. The numerical reference 401 of FIG. 4B corresponds to the numerical reference 101 of FIG. 2B.

In the system 400 according to the invention, the display selection means 430 are set up to receive a request Re, relating to at least one maintenance operation to be carried out (step 4011). For that, the display selection means 430 comprise a memory, for storing the request Re, and means of communication with an external device supplying the request Re. The external device may consist of a man-machine interface from which a user formulates the request Re, or a maintenance center that has previously established the request on the basis for example of fault messages transmitted by the aircraft.

The request Re corresponds to a list of maintenance operations formed for example of a series of computer files, each relating to one maintenance operation.

The request Re contains various information relating to each maintenance operation to which it relates. This information comprises for example a list of at least one identifier of interest, each identifier of interest corresponding to an equipment that is to be adjusted, replaced, or repaired for performing at least one of the maintenance operations associated with the request Re. This information may also comprise a list of the positions of each of these equipment. This information may also comprise maintenance assistance data relating to each of these equipment.

This request Re is received in particular by an extraction module 433.

The extraction module 433 is set up to analyze the request Re, and extract from it at least one piece of information from among:

the list of identifiers of interest Lid, each identifier of interest corresponding to an equipment affected by at least one maintenance operation associated with the request Re, referred to as equipment of interest (step 4012);

the set E of maintenance assistance data relating to each of these equipment, the data being classified within the set E according to the equipment concerned (step 4013);

the list Lpos of positions of each of these equipment (step 4014).

For preference, each position on the list Lpos corresponds simply to an indication of a region of the aircraft in which the equipment can be found (for example avionics bay, hold, etc.).

Figure 4A:
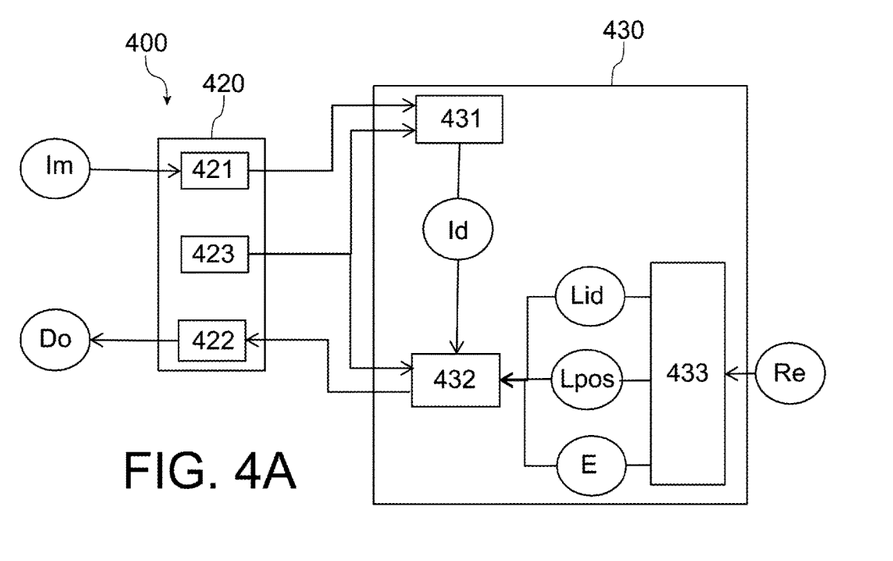
FIGS. 4A and 4B schematically illustrate a third embodiment of a system and a method according to the invention.
Figure 4B:
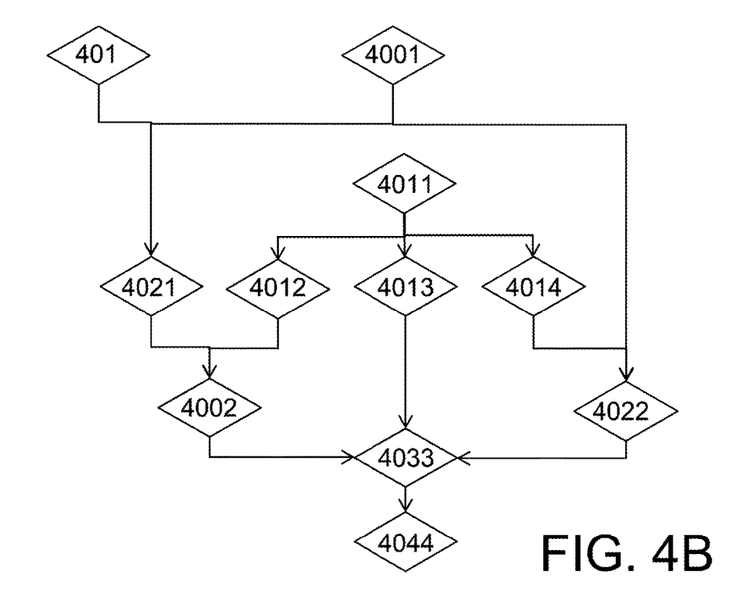

FIGS. 4A and 4B depict an example in which the extraction module supplies these three pieces of information, but variants involving the extraction of just one or two of these pieces of information may be performed.

Steps 4012, 4013 and 4014 are advantageously carried out in parallel.

The portable device 420 comprises a geolocation module 423 able to calculate a position of the portable device, in particular a position relative to the aircraft. The geolocation module 423 supplies this position to the display selection means (step 4001), particularly to the display selection module 432 and to the shape recognition means 431.

The position of the portable device may correspond to a position relative to a point of reference, for example a point of reference in the aircraft.

According to a preferred alternative form, the position of the portable device corresponds simply to an indication of a region of the aircraft in which the portable device is located (for example avionics bay, hold, etc.). These are advantageously the same regions as those used for defining the positions of the equipment of interest.

The geolocation module may comprise means of reading a marker such as an RFID chip, a bar code, a QR code, etc. Such markers are spread throughout the various regions of the aircraft thus making it possible to determine the region of the aircraft in which the portable device is situated, simply by reading one of these markers.

Another example of a geolocation module will be described in detail with reference to FIG. 5.

The shape recognition means 431 are set up to identify the equipment present in an image Im supplied by the camera, taking account of the position of the portable device so as to select a restricted list of equipment that may correspond to the equipment present in the said image (step 4021). For example the database stored by the shape recognition means 431 also associates each equipment with a position in the aircraft. In particular, each equipment is associated with a region of the aircraft as defined hereinabove. Thus, the shape recognition means may determine a restricted list of equipment which are situated in the same region as the portable device, then perform shape recognition. The calculations performed are therefore vastly simplified.

The information Lid, Lpos and E is supplied to the display selection module 432. If the display selection module 432 receives the set E as defined hereinabove, it is not absolutely necessary for this module to comprise a database in which each equipment identifier is associated with maintenance assistance data.

The display selection module 432 is set up to compare the useful identifier Id and at least one identifier of interest from the list Lid (step 4002).

Advantageously, the display selection module 432 is also set up to compare the position of the portable device with a position of an equipment of interest, which position is supplied by the list Lpos (step 4022). This comparison preferably compares positions each corresponding to one region of the aircraft. The result of this comparison then indicates whether or not the portable device and the equipment are both in the same region of the aircraft. The result of this comparison can be used by the display selection module in different ways, as detailed herein below. For preference, the step 4022 comprises a comparison between the position of the portable device and each of the positions of an equipment of interest as supplied by the list Lpos.

The display selection module 432 selects data and supplies these to the augmented reality display means (step 4033). There are in particular three possible scenarios:

an equipment is present in the image supplied by the camera, is identified, and corresponds to one of the equipment of interest that are associated with the list Lid. In that case, the display selection means select and send out maintenance assistance data relating to this equipment (see step 3003, FIG. 3B). If relevant, these data come from the set E as defined hereinabove.

No equipment corresponding to one of the equipment of interest which are associated with the list Lid is identified on the image supplied by the camera and the step 4022 indicates that an equipment of interest is nevertheless close to the portable device. In that case, the display selection means select and send alert data to alert a user to the fact that he is near this equipment.

No equipment corresponding to one of the equipment of interest which are associated with the list Lid is identified from the image supplied by the camera, and the step 4022 indicates that no equipment of interest is close to the portable device. In that case, the display selection means select and send out guidance data to guide a user towards an equipment of interest, for example the closest one or the next one that is to be adjusted in a recommended order of adjustment of the equipment to which the maintenance operations relate. In order to perform this guidance, the display selection module 432 uses a plan of the aircraft, notably a three-dimensional model of the aircraft, stored in a memory of the display selection means.

Next, in a step 4044, the augmented reality display means 422 display in augmented reality, as the case may be:

images corresponding to the maintenance assistance data received (see step 204, FIG. 2B);

images corresponding to the alert data received, for example a flashing symbol, to alert the user to the fact that he is near to an equipment of interest;

images corresponding to the guidance data received, for example a symbol such as an arrow to guide a user towards an equipment of interest, for example the nearest one.

The display selection means may perform a classification of the identifiers of interest, on the basis of the respective positions of the corresponding equipment of interest and a plan of the aircraft. This classification is set up to minimize the length of the journey that the user must make through the aircraft when guided from one equipment of interest to another.

The display selection means may perform a classification of the identifiers of interest on the basis of the corresponding maintenance operation, so that a user does not begin a new maintenance operation until after a maintenance operation previously begun has been completed.

This embodiment of the invention allows a user to be offered a display suited to the maintenance operations to be carried out and the position of the user. The maintenance thus becomes easier, and maintenance time is reduced.

This embodiment is particularly comprehensive and can easily implement numerous alternative forms whereby just some of the steps and modules described are employed, for example extraction and use of just some of the data on the basis of a request relating to at least one maintenance operation to be carried out are implemented.

Figure 5:
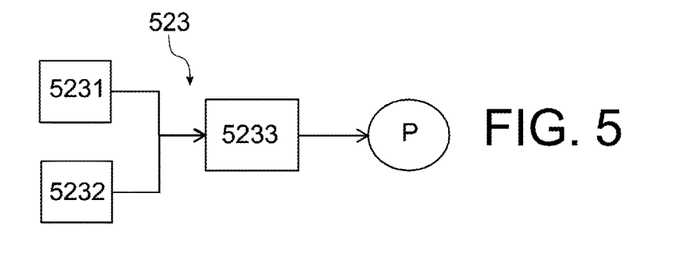
FIG. 5 schematically illustrates a detail of a fourth embodiment of a system according to the invention, associated with a fourth embodiment of a method according to the invention.

FIG. 5 illustrates a particular example of a geolocation module 523, as mentioned with reference to FIG. 4A. FIG. 5 also illustrates sub steps of a step 4001 as mentioned with regard to FIG. 4B, during which step the portable device 420 supplies its position to the display selection means 430.

The geolocation module 523 comprises:

geolocation means 5231 supplying a position of the portable device relative to a fixed point of reference, referred to as a rough position. These means for example comprise a satellite navigation device of GPS type. These means correspond to a sub step of determining the said rough position;

a memory 5232, receiving a three-dimensional model of the aircraft. This memory corresponds to a sub step of comparing the rough position with the model; and comparison means 5233 receiving the rough position and the model at input, and at output supplying the position P of the portable device relative to the aircraft. These means correspond to a sub step of determining the position of the portable device.

Figure 6:
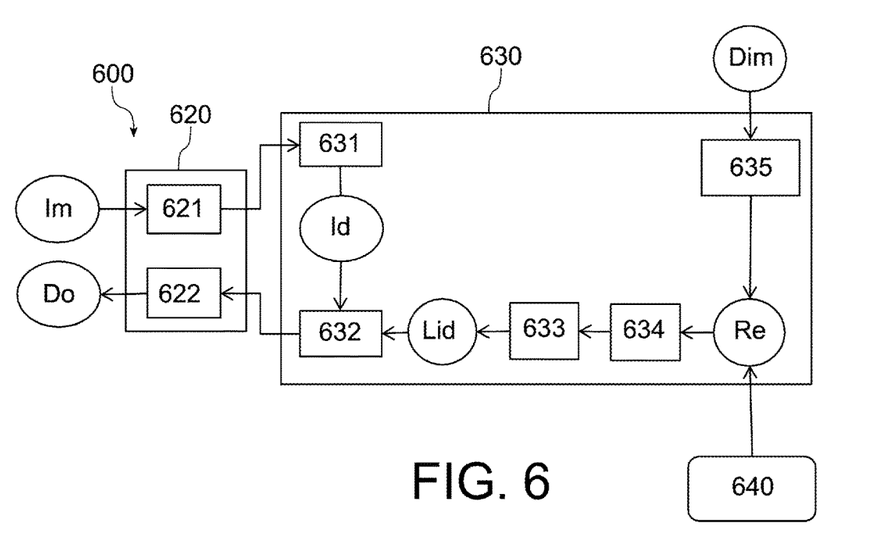
FIG. 6 schematically illustrates a fifth embodiment of a system according to the invention, associated with a fifth embodiment of a method according to the invention.

FIG. 6 schematically illustrates a fifth embodiment of a system 600 according to the invention, associated with a sixth embodiment of a method according to the invention.

The system 600 will be described only in terms of how it differs from the system 100 illustrated in FIG. 1. The same is true of the method. The numerical references of FIG. 6 correspond to the numerical references of FIG. 1, the numeral for the hundreds being replaced by a 6.

According to this embodiment, the display selection means 630 comprise means of communication (which have not been depicted) with a maintenance center 640. The maintenance center sends the display selection means 630 a request Re as defined with regard to FIGS. 4A and 4B. The communication may be a wireless (for example WiFi) communication. As an alternative, communication is performed by direct contact between a point of contact of the display selection means 630 and a request loading terminal situated in the maintenance center. This request may be accompanied by guidance data guiding towards the aircraft to which the maintenance operations to be carried out relate. Thus, the augmented reality display means may display, in augmented reality, images corresponding to these guidance data in order to lead the user towards the aircraft.

The method performed in the system 600 comprises a sending-out, by the maintenance center 640 to the display selection means 630, of at least one request Re.

The request Re is then stored in a memory 634 of the display selection means 630. The memory 634 is able to store a list of several requests Re, for example so that a user can then carry out maintenance on several aircraft.

The memory 634 transmits a first request to extraction means 633. The extraction means 633 notably supply the list Lid as described with reference to FIGS. 4A and 4B.

The display selection means 630 also comprise means 635 for formulating a request Re. The means 635 notably comprise a man-machine interface, receiving input data Din supplied by a user, and formulating the request Re from these input data Din.

The method performed in the system 600 may then comprise a step during which the user sends the data Din to the means 635 using a man-machine interface of the said means 635.

For example, the user consults the logbook of an aircraft. This logbook compiles incidents that have occurred beforehand in the aircraft. From these the user deduces what maintenance operations are to be carried out. He therefore orientates the formulation of the request Re accordingly so that he can then be assisted in performing the said operations.

As an alternative, the user carries out the maintenance operations corresponding to a request supplied by the maintenance center, and notices that a fault still remains. From that he can then deduce a further maintenance operation to be carried out, and orientate the formulation of a new request Re accordingly.

Figure 7:
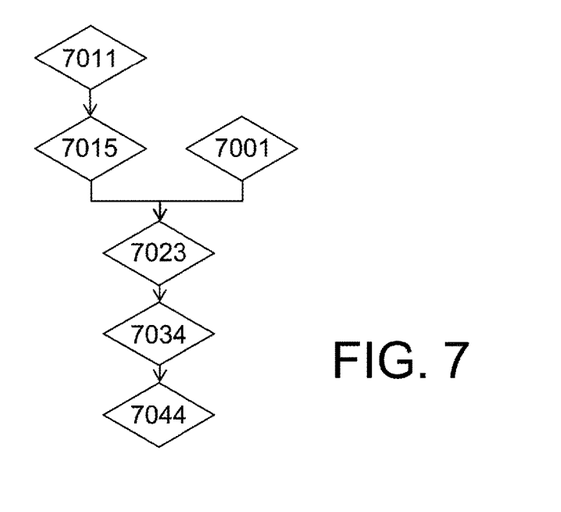
FIG. 7 schematically illustrates a detail of a sixth embodiment of a method according to the invention, associated with a sixth embodiment of a system according to the invention.

FIG. 7 schematically illustrates a detail of a sixth embodiment of a method according to the invention, associated with a sixth embodiment of a system according to the invention. This sixth embodiment is an improvement of the embodiment of FIG. 4B.

The numerical references 7011 and 7001 correspond to the numerical references 4011 and 4001 of FIG. 4B.

The request Re received in step 7011 corresponds to a list of several maintenance operations, each one associated with a position of interest. The said position of interest may in particular correspond to a region of the aircraft in which the equipment relating to the maintenance operation are all located.

In a step 7015 the display selection means extract from the request Re the positions of interest that are associated with each maintenance operation, and classify the maintenance operations on the basis of their position of interest and on the basis of a model of the aircraft. The objective of this classification is, for example, to minimize the length of the journey that the user has to make through the aircraft. The corresponding system therefore comprises an extraction module and a classification module belonging to the display selection means and set up to perform step 7015.

In a step 7023, the display selection means compare the position of the portable device as received in step 7001, and the positions of interest considered in the order of the classification. The display selection means select and send out guidance data to guide a user from one region of the aircraft to the next so that the user performs the maintenance operations in the order of the classification.

In step 7044, the augmented reality display means receive these data. In response they display in augmented reality images corresponding to these guidance data.

These steps may for example be integrated into a method as described with reference to FIG. 4B, so as to define the following three scenarios:

the portable device is not located at the position of interest corresponding to the next maintenance operation to be carried out, in the order of the classification: the display selection means select and send out guidance data guiding towards this position of interest;

the portable device is located at the said position of interest, and no equipment associated with the corresponding maintenance operation has been identified: the display selection means select and send out alert data informing that such an equipment is nearby;

the portable device is located at the said position of interest, and an equipment associated with the corresponding maintenance operation has been identified: the display selection means select and send out maintenance assistance data relating to this equipment.

The invention is not restricted to the examples described. Furthermore, numerous alternative forms employing just some of the elements described can easily be carried out as long as the essential elements of the invention are implemented.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for supporting aircraft maintenance, performed in a system comprising:
  display selection means; and
  a portable device comprising a camera and augmented reality display means;
  comprising the following steps:
  acquiring images with the camera of an equipment of the aircraft, and sending these images to the display selection means;
  identifying the equipment present in the said images with the display selection means and determining an identifier of the identified equipment, referred to as the useful identifier;
  selecting maintenance assistance data by the display selection means from this useful identifier relating to the identified equipment and sending these data to the augmented reality display means;
  displaying images corresponding to the maintenance assistance data by the augmented reality display means display, in augmented reality,
  further comprising:
  supplying the display selection means by the portable device with a position of the portable device;
  performing a comparison between the position of the portable device and a position of an equipment of interest by the display selection means, the equipment of interest corresponding to an identifier of interest from a list of identifiers of interest received by the display selection means such that the display selection means send out maintenance assistance data only when the useful identifier corresponds to one of the identifiers of interest from the list;
  selecting guidance data by the display selection means guiding towards the equipment of interest based on a plan of the aircraft and sending these data to the augmented reality display means if the portable device is not close to the equipment of interest based on said performed comparison;
  displaying, by the augmented reality display means, in augmented reality, images corresponding to these guidance data, wherein the images guide a user of the portable device towards the equipment of interest;
  wherein the method also comprises the following steps:
  receiving, by the display selection means, a request relating to at least one maintenance operation to be carried out, wherein the request corresponds to a list of maintenance operations, each of the list of maintenance operations being associated with a position of interest;
  extracting, by the display selection means, from the received request, the list of identifiers of interest, an identifier of interest corresponding to an equipment of interest, and the equipment of interest forming an equipment associated with one from the at least one maintenance operation to be carried out, wherein said extracting comprises also extracting the positions of interest that are associated with each maintenance operation to be carried out;
  classifying, by the display selection means, each of the at least one maintenance operation to be carried out based on the respective maintenance operation's position of interest and on a model of the aircraft to provide an order of classification; and
  performing a comparison between the position of the portable device and the positions of interest considered in the order of classification from said classifying; and
  wherein the selection of guidance data comprises also selecting guidance data guiding towards the positions of interest in the order of classification from said classifying.

2. The method according to claim 1, wherein, for each identifier of interest from the list, and on the basis of the request relating to at least one maintenance operation to be carried out, the display selection means extract a position of the corresponding equipment of interest.

3. The method according to claim 1, wherein, for each identifier of interest from the list, and on the basis of the request relating to at least one maintenance operation to be carried out, the display selection means extract corresponding maintenance assistance data.

4. The method according to claim 1, wherein the portable device performs the following steps:
  determining a rough position of the portable device, relative to a point of reference;
  comparing this rough position with a model of the aircraft;
  determining the position of the portable device, relative to the said aircraft.

5. The method according to claim 1, wherein, in order to identify the equipment present in said images, the display selection means select a list of equipment situated in proximity to the portable device, on the basis of the position of the portable device and of the positions of the aircraft equipment.

6. The method according to claim 1, wherein:
  the display selection means select and send out to the augmented reality display means, alert data relating to the proximity of an equipment of interest when the position of the portable device corresponds to the position of an equipment of interest; and
  the augmented reality display means display, in augmented reality, images corresponding to these alert data.

7. The method according to claim 1, further comprising a step whereby the request relating to at least one maintenance operation to be carried out is formulated by a human operator and using a man-machine interface.

8. The method according to claim 1, further comprising a step whereby the request relating to at least one maintenance operation to be carried out is sent out by a maintenance center.

9. The method according to claim 1, wherein the displayed images corresponding to the guidance data include an arrow guiding the user towards the equipment of interest.

10. An aircraft maintenance assistance system, comprising:
  display selection means; and
  a portable device comprising a camera and augmented reality display means;
  the camera being connected to the display selection means and set out to capture images and to send these images to the display selection means;
  the display selection means being connected to the camera and to the augmented reality display means, and being set out to identify an aircraft equipment present in the said images, determine an identifier of the identified equipment, referred to as the useful identifier, select maintenance assistance data relating to the equipment identified using the useful identifier, and send these data to the augmented reality display means; and the augmented reality display means being set up to receive these maintenance assistance data and, in response, display in augmented reality images corresponding to these maintenance assistance data;

the portable device comprising a geolocation module connected to the display selection means to supply them with a position of the portable device;

the display selection means comprising a comparator for comparing the position of the portable device and the position of an equipment of interest, the equipment of interest corresponding to an identifier of interest from a list of identifiers of interest received by the display selection means such that the display selection means send out the maintenance assistance data only when the useful identifier corresponds to one of the identifiers of interest from the list;

the display selection means being set up to select guidance data guiding towards the equipment of interest based on a plan of the aircraft and send these data out to the augmented reality display means if the portable device is not close to the equipment of interest based on said comparing; and the augmented reality display means being set up to receive these guidance data and, in response, display in augmented reality images corresponding to these guidance data, wherein the images guide a user of the portable device towards the equipment of interest;

the display selection means being set up to receive a request relating to at least one maintenance operation to be carried out, wherein the request corresponds to a list of maintenance operations, each of the list of maintenance operations being associated with a position of interest;

the display selection means further comprising an extraction module for extracting, from the received request, the list of at least one identifier of interest, an identifier of interest corresponding to an equipment of interest, and the equipment of interest forming an equipment associated with one from the at least one maintenance operation to be carried out, wherein said extracting comprises also extracting the positions of interest that are associated with each maintenance operation; and the display selection means further comprising a classification module for classifying each of the at least one maintenance operation to be carried out based on the respective maintenance operation's position of interest and on a model of the aircraft to provide an order of classification;

wherein the comparator compares the position of the portable device to the positions of interest considered in the order of classification; and wherein the display selection means are also set up to select guidance data guiding towards the positions of interest in the order of classification from said classifying.

11. The method according to claim 1, wherein the guidance data guides the user to either a closest one of the equipment of interest or a next one of the equipment of interest from the list of identifiers of interest that is to be adjusted in a recommended order of adjustment.

12. The system according to claim 10, wherein the displayed images corresponding to the guidance data include an arrow guiding the user towards the equipment of interest.

13. The system according to claim 10, wherein the display selection means comprise:
   shape recognition means set up to identify the aircraft equipment from the images captured by the camera, and supplying as output the useful identifier; and
   a display selection module receiving the useful identifier as input and, in response, providing the augmented reality display means with the maintenance assistance data relating to the equipment identified.

14. The system according to claim 10, wherein the guidance data guides the user to either a closest one of the equipment of interest or a next one of the equipment of interest from the list of identifiers of interest that is to be adjusted in a recommended order of adjustment.

* * * * *